United States Patent [19]

Brys et al.

[11] 4,396,454
[45] Aug. 2, 1983

[54] APPARATUS FOR SIMULTANEOUSLY JOINING AND LAMINATING LENGTHS OF MATERIAL

[76] Inventors: Lyle E. Brys, 7211 E. 60th Ave., Commerce City, Colo. 80022; Myron L. Jones, 2278 Forest, Denver, Colo. 80207

[21] Appl. No.: 278,993

[22] Filed: Jun. 30, 1981

[51] Int. Cl.³ .................. B32B 31/00; B32B 31/04; B65C 11/04
[52] U.S. Cl. .................. 156/494; 156/324; 156/546; 156/578
[58] Field of Search .............. 156/304.1, 324, 494, 156/544, 546, 549–551, 578

[56] References Cited

U.S. PATENT DOCUMENTS

| | | | |
|---|---|---|---|
| 1,410,879 | 3/1922 | Bither | 156/324 |
| 3,004,694 | 10/1961 | Karl | 229/4.5 |
| 3,615,994 | 10/1971 | MacLaine | 156/304.1 X |
| 3,767,510 | 10/1973 | Gustafson | 156/494 |
| 4,050,972 | 9/1977 | Cardinal, Jr. | 156/71 |
| 4,172,751 | 10/1979 | Mougin | 156/324 |

FOREIGN PATENT DOCUMENTS

| | | | |
|---|---|---|---|
| 74572 | 9/1918 | Austria | 156/544 |
| 1199029 | 7/1970 | United Kingdom | 156/544 |

*Primary Examiner*—William A. Powell
*Attorney, Agent, or Firm*—Gregg I. Anderson

[57] ABSTRACT

A method and apparatus for forming an insulation blanket adapted for use in the accelerated curing of prestressed concrete is disclosed. Sets of feed rollers are positioned in equal numbers on opposite sides of a take-up drum. The feed rollers of each set carry a vinyl material forming an outer layer of said blanket. Each roller of said set is offet relative to the adjacent rollers so that the ends thereof overlap with respect to the adjacent rollers. An insulation feed roller feeds a heavy insulation medium layer onto the take-up drum. Equal numbers of sets of said feed rollers apply said vinyl outer layer to opposite sides of said medium layer. Adhesive is applied to each feed roller as the vinyl outer layer leaves said feed roller, providing means for joining the vinyl materials together and to the medium layer.

23 Claims, 9 Drawing Figures

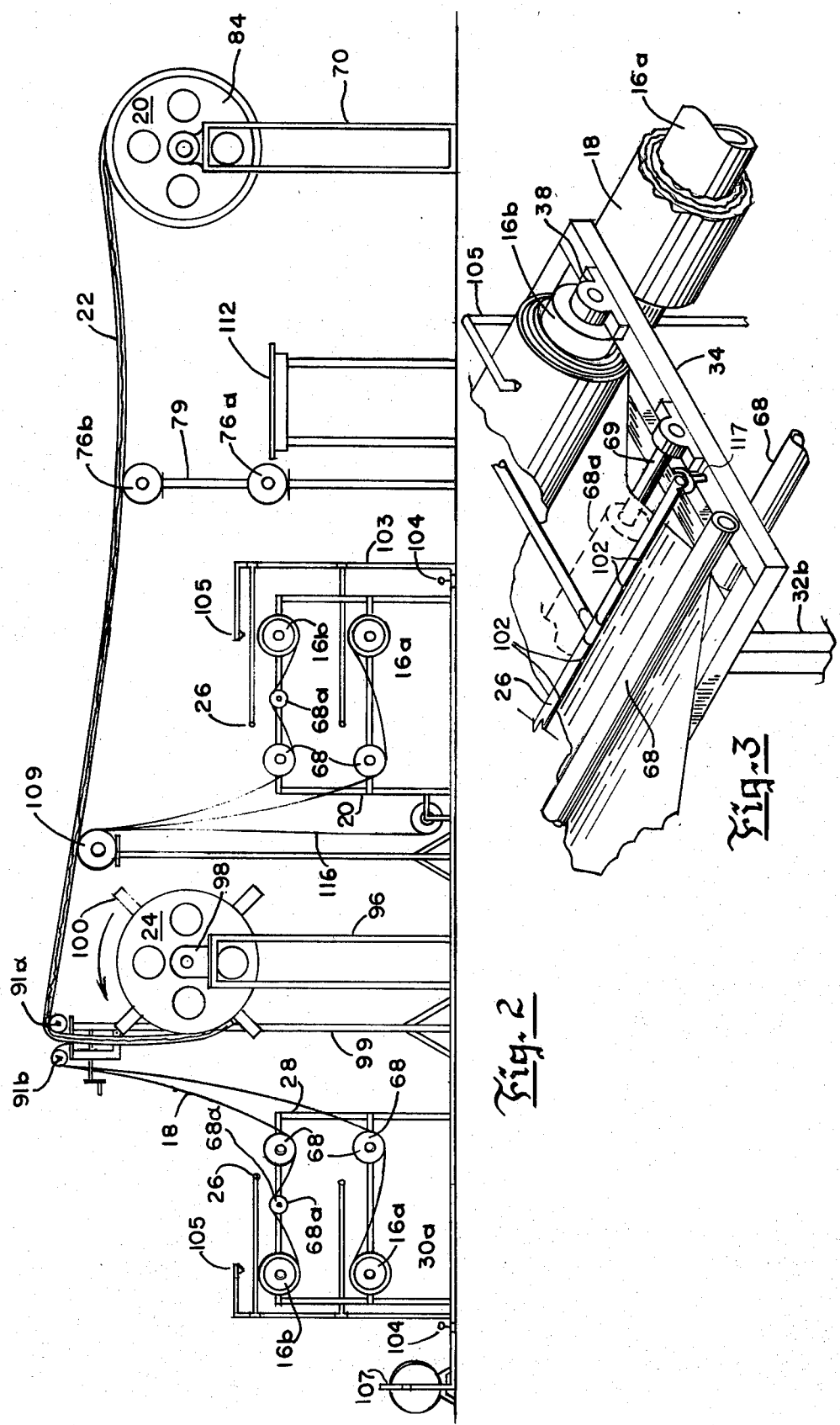

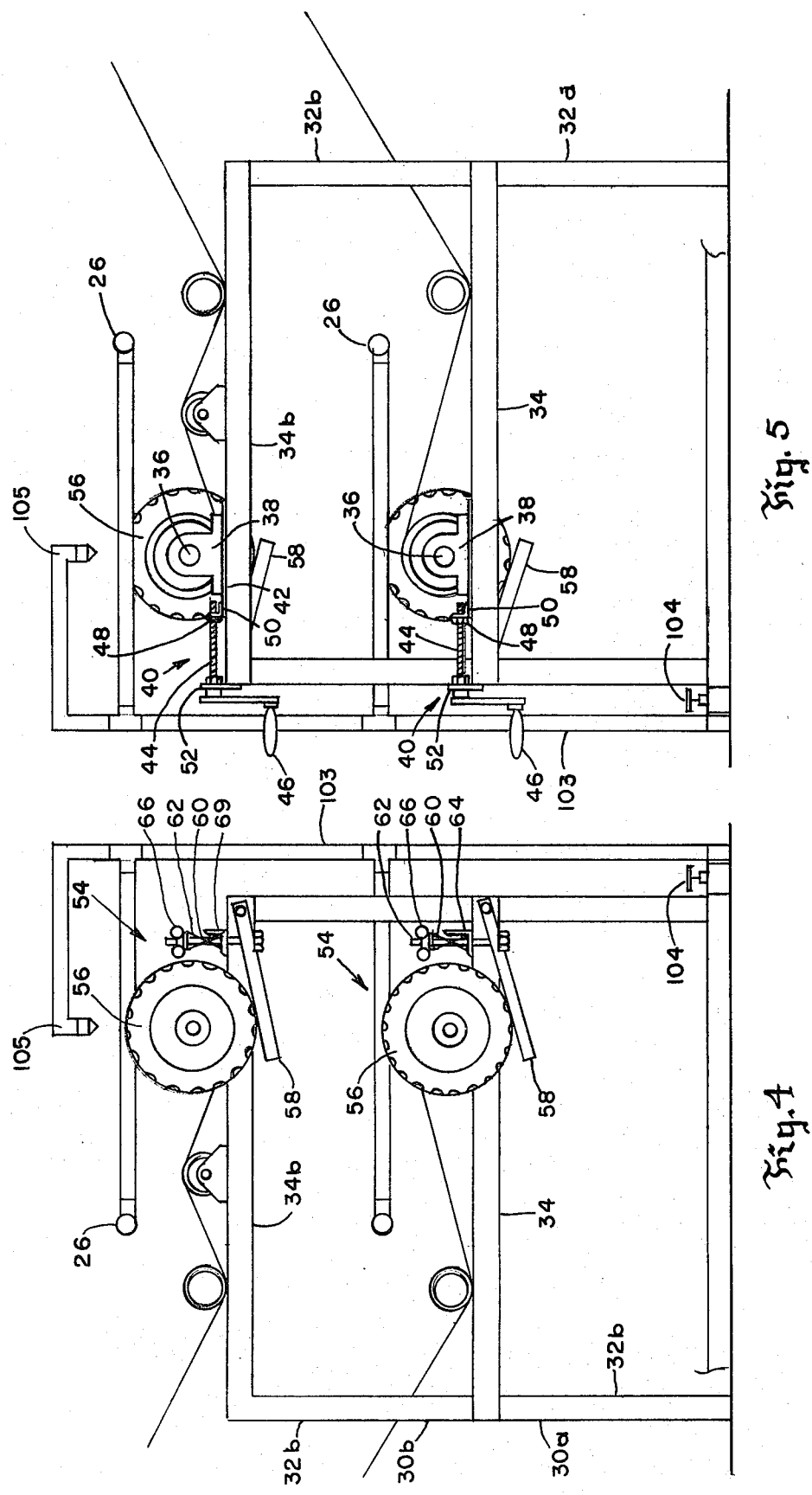

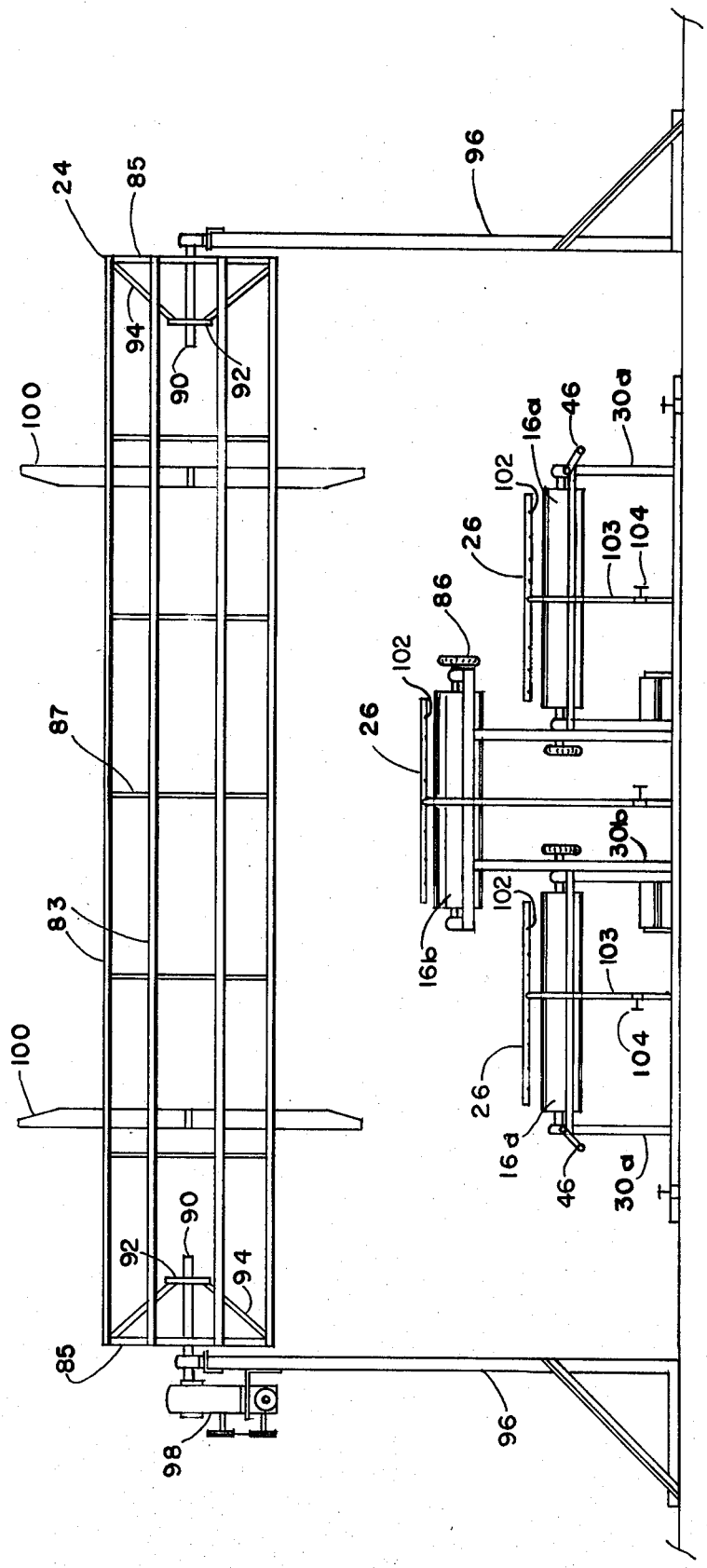

APPARATUS FOR SIMULTANEOUSLY JOINING AND LAMINATING LENGTHS OF MATERIAL

BACKGROUND OF THE INVENTION

1. Field of the Invention

The present invention relates generally to a method and apparatus for laminating lengths of material together, and, more particularly, wherein rollers carry the lengths of material.

2. Brief Description of the Prior Art

Forming layered or laminated material products by the use of a plurality of generally equal length rollers carrying lengths of material, the rollers having parallel axes of rotation, is well known. Such apparatus are seen in Gustafson (U.S. Pat. No. 3,767,510) and Karl (U.S. Pat. No. 3,004,694). The roller apparatus of Gustafson utilizes feed rollers that are positioned so that a laminated product of width equal to that of the material being fed from the plurality of feed rollers is produced. Karl uses various material widths and sequential feeding to form a container product. No provisions exists in either prior art reference for making a wider laminated product by joining several pieces of material along longitudinal edges thereof.

The joinder of material along longitudinal edges, without forming a laminated product, is seen in Bither (U.S. Pat. No. 1,410,879). In Bither, a pair of offset feed rollers feed cardboard through adjacent corrugated rollers to compress the edges of the cardboard being fed therethrough into a longitudinal seam. The adjacent rollers pinch the edges together to join the separate pieces of cardboard.

Cardinal (U.S. Pat. No. 4,050,972) shows lengths of material joined at the edge to form a blanket having a longitudinal seam. The blanket is laid over a playing field by a roller apparatus. The parallel pieces of plastic material overlap on the edges and are joined along the longitudinal seam by heat sealing or a similar process. Cardinal does not join the rolls of material together simultaneously as they are laid out, nor is a laminated product produced.

Mougin (U.S. Pat. No. 4,172,751) does utilize offset rollers which overlap at the ends thereof to join pieces of material together at the edge thereof. A separate strip of material is laid over the resulting seam to join two parallel lengths of material together. The separate strip is welded or sewn to the adjoining pieces of material. Mougin therefore uses a separate piece of material so that larger widths of material can be joined directly at the edge thereof, without overlap. The separate material is either welded or sewn to the two principal pieces of material, at a later time, not simultaneously or continuously. No laminate product is formed by the technique of Mougin. The resulting product is accumulated on a take-up drum for later utilization in insulating icebergs towed from antarctic seas to tropical waters.

The prior art does not show means for controlling longitudinal variation in separate pieces of material to be joined at or near an edge thereof. The patent to Gustafson shows a web guide for compensating for unevenly cut strips of material. No apparatus similar to Gustafson has been available in the art for maintaining a preselected overlap between adjacent pieces of parallelly extending lengths of material joined together at or near the edge thereof.

Though the use of adhesives in lamination is also well known, the use of an adhesive to simultaneously laminate layers as well as join parallel lengths of material together has not heretofore been utilized. Similarly, no method for evenly and uniformly applying the adhesive to the various pieces of material has been developed. The evenness of adhesive application is governed by the tension in the lengths of material being fed from their respective rollers to the primary take-up drum. The tension in the material itself is important in both uniform feeding of material and adhesive application. None of the prior art references show the use of variable tensioning to control feed as well as adhesive application.

A particular application of the product of the present invention is in insulated thermal blankets for covering prestressed concrete form beds. In a conventional manner, the form beds are adapted to receive a number of strands of pretensioned cable. The beds are then filled with concrete. Release of the tension in the strands, after setting and curing of the concrete, makes a strong and light prestressed concrete product. In order to maintain proper quality of the concrete, as well as maintaining a daily production rate, once the concrete is poured, the common practice is to apply heat to the beds for a period of eight to twelve hours to cure the concrete. As a matter of energy conservation, and expense savings, thermal blankets reduce the required amount of heat.

Previous practice has been to utilize a medium layer between two outer layers to form a laminated thermal blanket to cover the concrete in the form beds. Because the form beds are generally eight to fifteen feet in width and four hundred feet long, commercially available vinyl outer layers must be spliced together to cover the beds. The widths of the vinyl outer layers is four and one half feet to five feet. Therefore, prior practice is to make either a large number of separate blankets to cover the form beds, or to make a continuous blanket, with increased thermal efficiency, by sewing or heat sealing strips of material together in layers in a crosswise fashion relative to the length of the bed. This means a single blanket can have as many as one hundred seams running transverse to the length of the bed. The handling of material lengths of four hundred foot length has, until now, prevented the use of longitudinal seams.

OBJECTS AND SUMMARY OF THE INVENTION

The principal object of the present invention is to provide a method and apparatus for producing an elongated laminated product of predetermined width by joining a length of material along a longitudinal edge thereof to adjacent lengths of material.

A related object of the present invention is to provide a method and apparatus for producing an elongated laminated product that simultaneously longitudinally joins adjacent lengths of material together into layers while laminating the layers so formed together.

A further related object of the present invention is to provide a final elongated laminated product wherein the number of seams between adjacent lengths of material are minimized.

Still a further related object of the present invention is to provide a method and apparatus for continuously producing an elongated laminated product having a predetermined width greater than the width of any single piece of material used to produce the product.

In accordance with the objects of the invention, a laminating device for producing an insulated blanket includes two separate sets of feed rollers placed on either side of an enlarged take-up drum. Each set of feed rollers includes offset feed rollers rotatably mounted on a frame. Adjacent feed rollers are offset relative to each other. Each roller of each set of feed rollers is prewound with a vinyl outer layer of material. Each set supplies an outer layer to the final laminated insulated blanket.

An insulation feed roller is of enlarged diameter relative to the feed rollers of the sets. Widths of insulation are prewound onto the insulation roller and fed onto the take-up drum. Both surfaces of the insulation are joined to a vinyl outer layer from one of the sets to produce a final product of three layers, a medium layer of insulation between two vinyl outer layers.

A tensioning mechanism is provided for each of the feed rollers. The outer layer fed from the feed rollers passes underneath a squeegee at a prescribed tension. An adhesive applicator deposits adhesive on one side of the squeegee. The tension in the material forming the outer layer, together with the presence of the squeegee, smooth the adhesive out over a portion of the surface of the material forming the outer layer as the material passes under the squeegee.

The outer layer as fed from the respective outer feed rollers of the set of feed rollers is guided by an alignment device. Variations along the length of a particular roll are therefore taken into account to insure an even overlapping with the intermediate roll of material of the vinyl outer layer.

BRIEF DESCRIPTION OF THE DRAWINGS

FIG. 2 is a side elevational view of the invention shown in FIG. 1 with material shown being carried on the rollers.

FIG. 3 is a fragmentary perspective view of a middle feed roller of a set of feed rollers of the invention shown in FIG. 1.

FIG. 4 is a side elevational view of a set of feed rollers of the invention shown in FIG. 1.

FIG. 5 is a side elevational view as seen in FIG. 4 from the opposite side.

FIG. 6 is a front elevational view of a take-up drum and a set of feed rollers of the invention shown in FIG. 1.

DESCRIPTION OF THE PREFERRED EMBODIMENT

Figure 7:
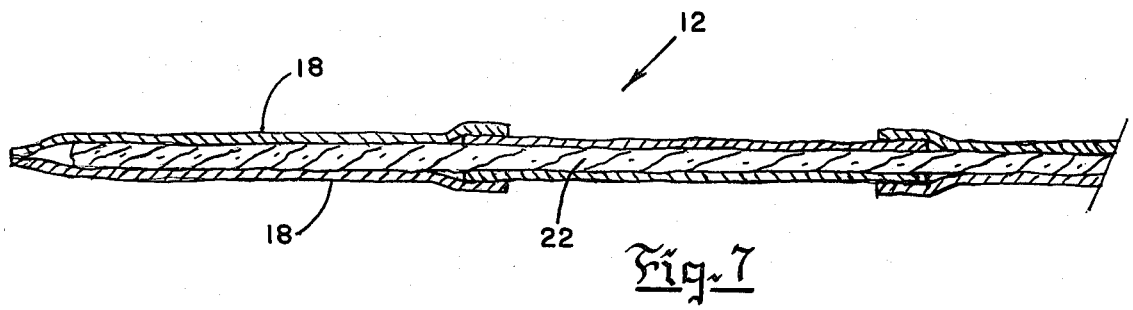
FIG. 7 is a fragmentary sectional view of an insulation blanket produced by the invention shown in FIG. 1.

A laminating device 10 (FIG. 1) for constructing an insulation blanket 12 (FIG. 7), which blanket 12 is utilized for steam curing prestressed concrete lying in a form bed, is seen in the drawings. The laminating device 10 includes two racks or sets of rollers 14, each set having three feed rollers 16, which feed rollers 16 are prewound with lengths of vinyl material, which material, when joined together as described, defines an outer layer 18. A relatively larger diameter insulation feed roller 20 is prewound with insulation material, which material defines a medium layer 22. The two sets 14 of feed rollers 16 and insulation roller 20 are aligned along a feed path so that the two outer layers 18 and medium layer 22 are longitudinally fed, in a layered configuration with the medium layer sandwiched between the two outer layers, onto an enlarged take-up drum 24. The blanket 12 is therefore formed of the three layers laminated together.

An adhesive applicator 26 (FIG. 2) ejects an adhesive onto the surfaces of the vinyl material as it leaves each of the feed rollers 16, in a manner to be discussed hereinafter. The relative positions of the feed rollers 16 within their respective sets 14 allow the several lengths of material forming the outer layer 18 to be longitudinally joined, edge to edge, by the adhesive as they are simultaneously laminated to the medium layer 22 by the applied adhesive.

Each set 14 of feed rollers 16 ideally includes three feed rollers 16. Each feed roller 16 has an overall length of approximately five feet to accommodate the vinyl material, which is a vinyl laminate such as is made by ECS, Inc., of Whiteville, Tennessee under the trademark "SHOWTIME". The vinyl material is commercially available in rolls having a four and one half of five foot width.

A set frame 28 rotatably mounts the three feed rollers 16. The set fame 28 has rectangular outside and intermediate support structures 30a and 30b, respectively, (FIGS. 4 and 5), for each feed roller 16. The support structures 30a and 30b are constructed from upright members 32a and 32b, respectively, interconnected at the top ends by four horizontal members 34. Two upright members 32a of each of the two outside support structures 30a, are shorter than the four upright members 32b forming the intermediate support structure 30b. The intermediate feed roller 16b is supported at an elevated position relative to the outer feed roller 16a on the longer upright members 32b. A pair of horizontal members 34b, which lie parallel to a rotational axis of the feed rollers of the intermediate support structure 30b, are supported at a distance from the end by upright members 32b (FIG. 6). The intermediate feed roller 16b it therefore positioned so that the ends thereof overlap corresponding ends of the outer feed rollers 16a, for a purpose to be made clear later.

An axle 36 protrudes from each end of each feed roller 16 to rotatably mount within self-aligning pillow block bearings 38 mounted on the horizontal members 34 of the support structures 30a and 30b (FIGS. 3 and 5). One of the two bearings 38 supporting the outer feed rollers 16a is connected to an alignment mechanism 40 (FIG. 5), which alignment mechanism 40 moves one end of the feed rollers 16a and 16b along a line transverse to the rotational axis fo the feed roller 16a, the purpose for which will be explained in detail hereinafter. The other end of each feed roller 16a remains relatively fixed, the bearing 38 allowing sufficient pivotal movement of the axle 36 to accommodate the transverse movement of the one end of the feed roller 16a.

The alignment mechanism 40 (FIG. 5) includes a slide plate 42 slidably mounted on a horizontal member 34, to which plate 42 the coupling 38 is rigidly fixed. The alignment mechanism 40 also includes a horizontally extending threaded bolt 44 and a crank 46. One end of the bolt 44 is threadably received by a nut 48 fixed to an L-shaped anchor 50, which anchor 50 is in turn fixed to the slide plate 42. The other end of the threaded bolt 44 is rotatably mounted in a collar 52 and fixedly connected to the crank shaft 46. The plate, and associated end of the feed roller 16a, are moved by rotating the crank 46 clockwise or counterclockwise.

An end of the feed rollers 16 is fitted with a tensioning device 54 (FIG. 4). In the outer feed rollers 16a, the end opposite the end on which the alignment mechanism 40 is mounted, connects to the tensioning device 54. The tensioning device 54 therefore includes a rubber wheel 56 mounted to the axles 36, a brake lever 58 pivotally mounted to the horizontal member 34 at one end, and frictionally contacting the rubber wheel 56 at or near the other end, as well as adjustable spring 60 fixed to the brake lever 58. The spring 60 coaxially receives a bolt 62. The bolt passes through the lever 58, the head of the bolt being tightly held against the lever. The bolt also passes through an anchor 64 fixedly mounted on the associated horizontal member 34. The spring fits over the bolt between the anchor and a wing nut 66. Turning the wing nut so that is moves downwardly relative to the anchor compresses the spring and the corresponding force applied by the brake lever 58 to the wheel 56 is increased. Resistance to rotation of the feed roller 16, as provided by the brake lever to the wheel and connected feed roller, helps govern the feeding of the lengths of material forming the outer layer 18 as they are wound onto the take-up drum 24, as well as assisting in uniform application of the adhesive, which will be further discussed hereinafter.

Figure 1:
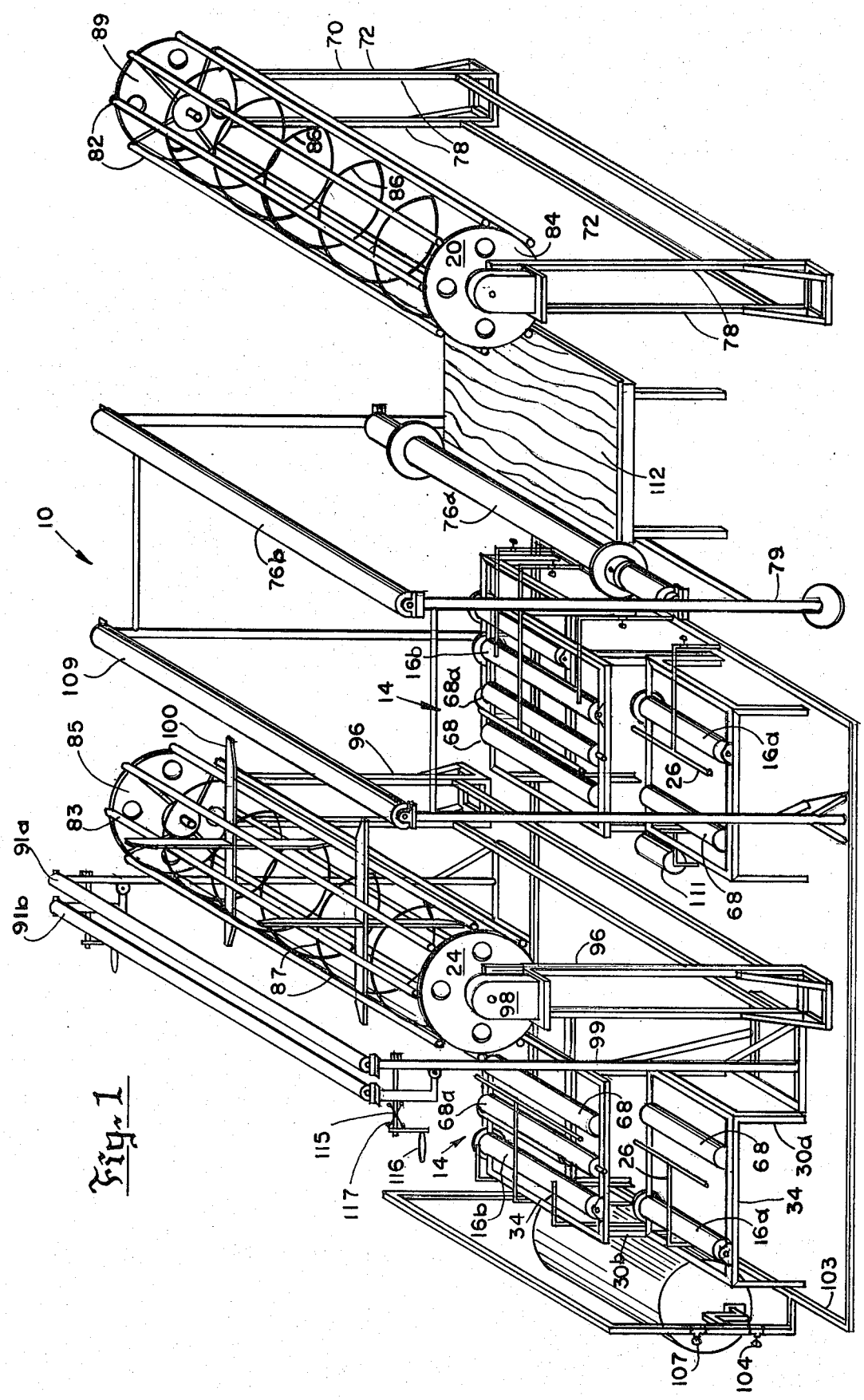
FIG. 1 is a perspective view of the laminating device of the invention with material carried on the rollers removed for clarity.
Figure 9:
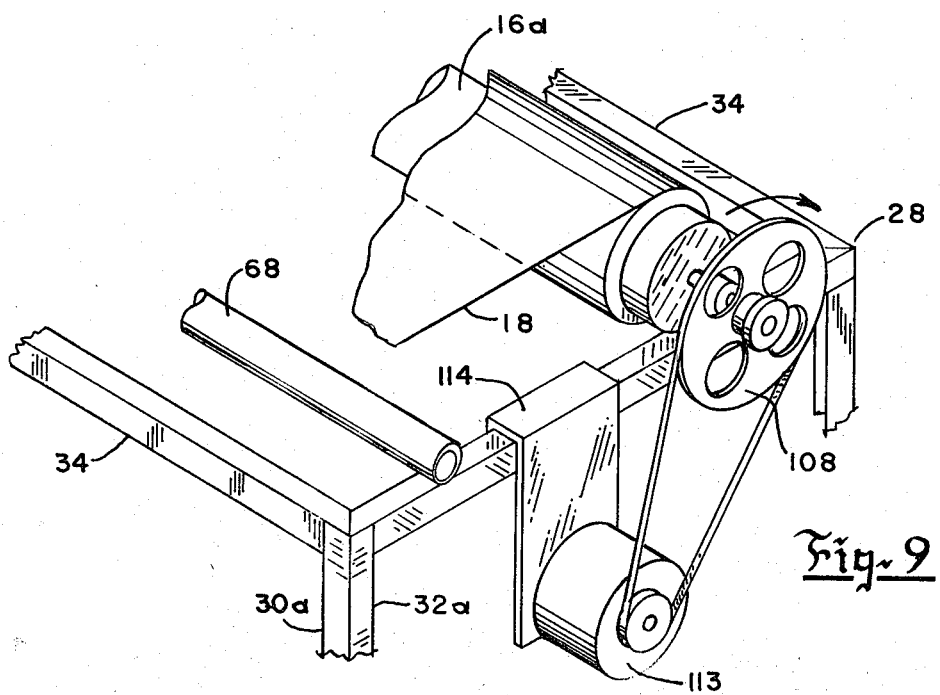
FIG. 9 is a fragmentary perspective view of the loading of one of the feed rollers of the invention shown in FIG. 1.

There is one set 14 of rollers 16 mounted on either side of the take-up drum 24 (FIG. 1). Each feed roller support structure 30a has threading means in the form of an elongated cylindrically-shaped squeegee 68 mounted across two of the horizontal members 34, the longitudinal axis of which sqeegee is parallel to the corresponding feed roller 16a. The squeegees 68 are positioned so as to lie between the feed roller and the take-up drum 24, in the feed path of the material forming the outer layer 18 as it is delivered onto the take-up drum. The material forming the outer layer 18 is therefore prewound onto the outer feed rollers 16a (FIG. 9), ideally so that the material forming the outer layer leaves the feed roller from the upper half of the feed roller (FIGS. 4 and 5). The outer layer is then threaded underneath the squeegee 68, and finally to the take-up drum 24.

The intermediate feed roller 16b (FIGS. 3, 4 and 5) is also prewound with a length of vinyl material forming a portion of the outer layer 18, but dispenses the material from the bottom half of the feed roller for reasons to be made clear shortly. A built-up roller 68a, forming a portion of threading means for the outer layer 18, has a gap or space 69 of reduced diameter at each end (FIG. 3). The roller 68a is positioned beetween the squeegee 68 and each intermediate feed roller 16b. The material is fed over roller 68a and under squeegee 68 to the take-up drum 24, for a purpose to be discussed shortly.

The insulation feed roller 20 is of substantially larger diameter than the feed rollers 16 mounted on the sets 14. This is necessary because the medium layer 22 is of substantially larger thickness than the outer layer 18, for example, one sixteenth of an inch or less compared to approximately one quarter of an inch. The larger diameter therefore more easily supports the greater thickness of the insulation in a roll configuration without introducing excessive shear forces to the insulation.

The insulation forming the medium layer 22 is fire retardant, closed-cell for non-absorption of moisture, and has a high tensile strength. Such a product can be obtained from the Uniroyal Rubber Company under the trademark "ENSOLITE".

The insulation feed roller 20 is rotatably supported on a frame 70 having a rectangularly configured support structure 72 at each end, to which support structure 72 the insulation feed roller 20 is rotatably mounted (FIG. 1). The support structure 72 includes four upright members 78. The four upright members 78 rotatably support the insulation feed roller 20 in a conventional manner. An idler support structure 74 is formed of vertical and horizontal members 79 and 80 respectively, to rotatably support two insulation idler rollers 76a and 76b in vertically superimposed relation.

The idler rollers 76 are rotatably mounted between the vertical members 79 of the support structure 74 so as to lie transverse to the path along which the medium layer 22 will be fed from the insulation roller 20 to the take-up drum 24. It is noted that the axes of rotation of the take-up drum 24, insulation roller 20, feed roller 16, idler rollers 76 and threading means 68 and 68a are all parallel, transverse to the feed path of the outer layers 18 and the medium layer 22 from the feed rollers 16 and insulation feed roller 20 respectively.

The size of the insulation roller 20, approximately three feet in diameter and twenty feet wide, necessitates a light structure (FIG. 1). The insulation roller 20 therefore has six ribs 82 extending the width thereof, the ribs supported at either end by disc-shaped end caps 84. Five circular hoops 86 are connected to the ribs at equal spaces along the width of the insulation roller 20.

The take-up drum 24 (FIG. 6) is of similar construction to the insulation roller 20, having ribs 83, end caps 85 and hoops 87. The take-up drum 24 is of essentially equal size to the insulation roller 20, for the same reason, storage of the relatively thick insulation blanket 12 on the take-up drum 24. A pivot rod 90 extends from the center of each cap 85 a relatively short distance outwardly and inwardly from the end cap. The inward end of each pivot rod 90 is connected to a circular hub 92 which supports the pivot rod through four struts 94 connected to the perimeter of the end cap 85.

The pivot rods 90 are rotatably mounted on a pair of end braces 96. A motor 98 is rigidly connected to one of the end braces 96 and is adapted to connect to one of the pivot rods 90 to thereby rotatably drive the take-up drum 24 and any supported blanket 12 that may be wound thereon.

A pair of spring-loaded pincher rollers 91 (FIG. 1) are conventionally supported, as by a stand 99, in a superimposed position over the take-up drum 24. One roller 91a is fixed relative to the stand, while roller 91b is pivotably mounted thereon. A bolt 115 threadably connects to the stand 99 at one end. The bolt passes through a spring 117 and connects to a crank 116. Turning the crank adjusts the tension in the spring 117. The pincher rollers 91 are closely spaced to each other and each lies generally in a plane containing a vertical line generally tangent to the circular take-up drum 24. The pincher rollers receive the outer layers from each set 14 and the medium layer 22 therebetween, compress the layers together and feed the laminated insulating blanket 12 onto the take-up drum 24.

Guide arms 100 extend radially away from the take-up drum 24 near either end thereof (FIG. 6). The alignment mechanism 40 turns the rotational axis of the outer feed rollers 16a so that the outside edges of the outer layers 18 being fed from the feed rollers 16 track against the guide arms 100. The intermediate feed roller 16b is also capable of such alignment. The end result is a blanket 12 having an outer layer 18 three widths of material wide, each layer precisely overlapping the adjacent layer, with even edges and uniform overall width.

The adhesive applicator 26 (FIG. 3) includes a plurality of holes or nozzles 102 formed in plastic line 103, like PVC pipe, which nozzles span the width of the material forming a portion of the outer layer 18 being fed from each feed roller 16. The line 103 is positioned to travel on the floor beneath the sets 14. Each applicator 26 has a T-connection at the line 103 and a valve 104 associated with a single feed roller. The applicator 26 extends up and over each length of material wound onto the rollers 16. The nozzles 102 are then distributed along the applicator length along a line transverse to the feed path. The ends of the transverse line are supported by "U" shaped supports 117 mounted on the horizontal members 34. Adhesive is ejected through the nozzles of each applicator 26 when the valve 104 is opened.

An edge adhesive applicator 105 communicates adhesive from the line 103 to a position above each edge of the intermediate roller 16a. This adhesive applicator 105 supplies adhesive that will ultimately contact adhesive applied across the surface of the material forming the outer layer 18 dispensed from the outer feed rollers 16a. The bond between adjacent pieces of material will therefore be enhanced by the adhesiveto-adhesive contact at the overlapping edges. The adhesive applicator 26 and edge applicator 105 are connected to an adhesive storage tank 107 by the fluid line 103.

Adhesive under pressure is forced through the line 103 and at a preselected rate through the nozzles 102 onto the upper surface, which surface eventually contacts the medium layer 22, of a length of material of an outer layer 18 on all rollers 16a and 16b. Adhesive is also applied by applicator 105 to the opposite or bottom surfaces of rollers 16b only, which rollers 16b feed lengths of material that are overlapped by the edges of the adjacent pieces of material fed by outer feed rollers 16a. The squeegees 68 act to uniformly spread the adhesive across the upper surface of material forming the outer layer 18 as the material moves underneath the squeegee 68. Roller 68a, over which an outer layer passes while being fed from the intermediate roller 16b, has the space or gap 69 formed thereon to prevent removal of the adhesive applied by edge applicator 105 to the bottom surface as the material goes over the top of roller 68a (FIG. 3).

The adhesive used is a commercially available adhesive having a nytril base. Such an adhesive is available from the Uniroyal Rubber Company under the trademark or product number "M6234".

In use, the laminating device 10 requires that the feed rollers 16 and insulating roller 20 be prewound with the outer layer 18 and medium layer 22 respectively. A removable pulley wheel 108 (FIG. 9) is selectively attachable to the axle 36 of the feed rollers 16. The pulley 108 is turned by a motor 113 mounted on a hook-like bracket 114 hung on the set frame 28. Rotation of the feed roller 16 by the motor winds the vinyl material from a shipment roll onto the feed rollers 16. Each set 14 of feed rollers 16 will form a single outer layer 18 of vinyl. As has been previously mentioned, the feed rollers in a given set are offset so that the ends of an intermediate roller 16b protrude over the ends of a pair of outer rollers 16a so that the vinyl outer layer 18 is formed by overlapping the edges of individual rolls of material.

The medium layer 22 is mounted upon the insulation feed roller 20. Several widths can be placed across the insulation feed roller 20 without the necessity of physically joining the insulation together for the reason that the continuous outer layer 18 will be adhered to the medium layer and hold the various components of the insulation blanket 12 in their respective positions. The medium layer 22 is therefore fed from the insulation feed roller 20 over an idler roller 109, to pincher rollers 91 and to the take-up drum 24.

It is noted, as seen in FIG. 1, that the medium layer 22 is fed over one set 14 of feed rollers 16. The various widths of the outer layer 18 coming from the feed roller 16 of the set 14 pass over idler roller 109 at which time they contact the medium layer 22. The material so fed forms the underneath outer layer 18 of the insulation blanket 12 as the take-up drum is rotated in a counterclockwise direction, as seen in FIG. 1.

Adhesive is applied to the outer layer 18 on the surface which contacts the medium layer 22, and at the edge of the opposite surface, by nozzle 105, of the intermediately positioned length of material forming outer layer 18. The intermediate length of material wound onto feed roller 16b is bonded to the other two lengths of material at the edges by the adhesive-to-adhesive contact. This application of adhesive not only joins the adjacent lengths of material together to form a complete outer layer 18, but also provides the means by which the outer layer is joined to the medium layer 22. It is noted that paper 116 is fed from roller 111 (FIGS. 2 and 6) to cover the seam between lengths of material as the outer layer 18 is formed. This paper is removed during finishing but prevents glueing the outer layers together as the blanke 12 is wound onto the drum 24.

The other set 14 of feed rollers 16 forms the opposite outer layer 18, which is joined to the medium layer 22. The seam formed between adjacent lengths of material is placed against the paper 116 fed from roller 111, preventing glueing the two outer layers to each other, as has been described. The process of feeding the lengths of material is the same as described for the first set 14.

The medium layer 22, sandwiched between two outer layers 18, is pinched between the two pincher rollers 91. The pressure applied increases the bonding characteristics of the adhesive. The three layers are then fed directly down to a rib 83 of the take-up drum 24, where the end is attached. The take-up drum rotates at a speed that is approximately ten to twenty feet per minute, depending on how much blanket is wound onto the drum.

Figure 8:
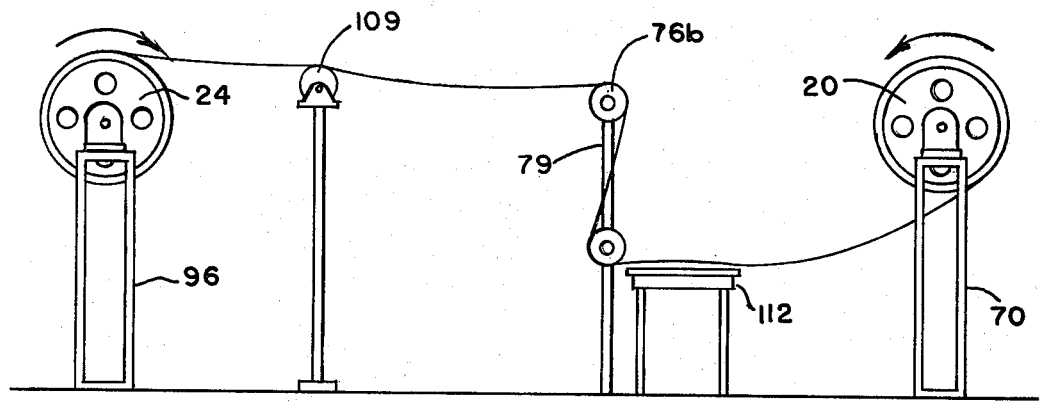
FIG. 8 is a schematic side elevational view of the unloading of an insulation blanket produced by the invention shown in FIG. 1.

Once the production run is complete, the blanket 12 is cut. The cut end is fed over idler 109 (FIG. 8), over idler roller 76b and under idler roller 76a. The blanket 12 is finished on a table 112, and fed onto the insulation feed roller 20 for storage and later loading for shipment.

The method of the present invention therefore includes prestoring lengths of material on the feed rollers 16 and the insulation feed roller 20. The feed rollers 16 are offset relative to adjacent rollers so that ends of the respective feed rollers overlap, while the axes of rotation of the various feed rollers are maintained in parallel relationship. A set 14 of feed rollers forms a single outer layer 18, while the insulation feed roller forms the single medium layer 22, which materials are simultaneously fed onto a single take-up drum.

Both outer layers 18 and the medium layer 22 are fed onto a take-up drum 22. While beiing fed from the feed roller 16, the outer layers 18 are uniformly covered with an adhesive which simultaneously bonds adjacent lengths of material together to form the single outer layer 18 and also joins the final outer layer 18 to the medium layer 22 in a laminated insulation blanket 12.

While the present invention has been described with a certain degree of particularity in the foregoing description, nothing contained therein shall serve to limit the scope of the invention as defined in the appended claims.

What is claimed is:

1. An apparatus for making a laminate by longitudinally joining pieces of material comprising in combination:
    a plurality of sets of rollers rotatably mounted to a frame, the number of sets of rollers corresponding to the layers of laminate, each roller carrying a length of material, said rollers of a set positioned so as to be offset relative to adjacent rollers, said rollers further having parallel axes of rotation, each of said sets in longitudinal alignment with the remaining of said sets;
    applicator means for applying adhesive to one surface of said material and to both surfaces of overlapped edges of selcted adjacent pieces of material fed from said rollers of said sets; and
    take-up drum means for receiving said materials fed from said sets.

2. The invention as defined in claim 1 further including:
    alignment means for maintaining a uniform width and a preselected overlap between edges of pieces of material fed from adjacent rollers.

3. The invention as defined in claim 2 wherein said alignment means includes:
    a sliding connection between said frame and said rollers at one end of selected ones of said rollers of said sets; and
    means for moving said one end along a line generally perpendicular to the axis of rotation of said roller.

4. The invention as defined in claim 3 further including:
    guide means connected to said take-up drum means for providing a guide against which the edge of said length of material fed from the selected rollers is placed.

5. The invention as defined in claim 1 wherein said applicator means further includes:
    at least one elongated cylindrical threading means mounted on said frame between each feed roller and said take-up drum, one of said threading means superimposed over the length of material fed from said feed roller; and
    an adhesive applicator fixedly mounted to a pressurized flow line carrying adhesive at a position between said feed roller and said threading means in superimposed position over said material.

6. The invention as defined in claim 5 wherein said adhesive applicator includes a plurality of ejection nozzles operatively connected to said flow line.

7. The invention as defined in claim 6 wherein said nozzles are spaced across the width of said material fed from said rollers.

8. The invention as defined in claim 1 wherein one surface of said lengths of material receives adhesive across the width thereof and a second surface of selected rolls of material receives adhesive at the edges thereof.

9. The invention as defined in claim 8 wherein said second surface is fed from a feed roller feeding from the bottom half of said roller, the remaining rollers feeding from the top half of said roller, said feed roller feeding from the bottom half having two threading means between the feed roller and take-up drum, the first threading means being interrupted for the passage of said material having adhesive at the edges over the top thereof and underneath the other threading means.

10. The invention as defined in claim 1 wherein said take-up drum is rotatably driven.

11. The invention as defined in claim 10 wherein said feed rollers further include tensioning means for resisting the take-up drum and evenly feeding said material from said feed roller.

12. The invention as defined in claim 11 wherein said tensioning means further includes:
    a wheel coaxially mounted with and fixedly connected to said feed roller;
    a brake lever pivotally mounted at one end to said frame and adapted to selectively engage said wheel; and
    adjustable spring means connected to said brake lever for varying the force applied to said wheel by said brake lever.

13. The invention as defined in claim 10 wherein a pair of idler rollers are superimposed above said take-up drum on a vertical tangent line therefrom, said idler rollers adapted to receive material from said sets of rollers.

14. An apparatus for making a laminate having an insulation medium layer joined to outer layers by longitudinally joining lengths of insulation material and outer layer material respectively comprising in combination:
    two or more sets of rotatable feed rollers mounted on a frame, each set of said feed rollers carrying one of said outer layers thereon and each feed roller of said set carrying a length of outer layer material, said sets aligned longitudinally with the length of said outer layer material, the feed rollers of each set positioned so as to be offset relative to adjacent rollers of that set, all of said feed rollers further having parallel axes of rotation;
    a rotatably driven take-up drum adapted to receive the outer layer material fed from said feed rollers;
    an insulation feed roller adapted to feed said medium layer, said medium layer formed from at least one length of insulation material, to said take-up drum between said outer layer material fed by two or more sets of feed rollers; and
    means for simultaneously joining said outer layer material fed from a set of feed rollers together into said outer layer and to the medium layer.

15. The invention as defined in claim 14 wherein a pair of idler rollers are superimposed above said take-up drum on a vertical tangent line therefrom, said idler rollers adapted to receive said outer and medium layers.

16. The invention as defined in claim 14 further including:
    applicator means for applying adhesive to join outer layer material from a feed roller of a set to outer layer material fed from another feed roller of said set and for joining all of the outer layer material fed to said medium layer.

17. The invention as defined in claim 16 wherein said applicator means includes:
   a pressurized flow line for conducting an adhesive; and
   a plurality of ejection nozzles connected to said flow lines for ejecting said adhesive onto said outer layer material at predetermined locations.

18. The invention as defined in claim 17 wherein said nozzles are spaced across the width of said outer layer material.

19. The invention as defined in claim 14 further including:
   alignment means for maintaining uniform width of said outer layer and a preselected overlap between outer layer material to be joined together into said outer layer by being fed from adjacent feed rollers.

20. The invention as defined in claim 19 wherein said alignment means includes:
   a sliding longitudinal connection between said frame and each feed roller, said connection positioned at one end of each of said rollers of said set; and
   means for moving said one end along a line perpendicular to the axes of rotation of said feed rollers and reconnecting said one end to said frame.

21. The invention as defined in claim 20 further including:
   guide means connected to said take-up drum for providing a guide against which an edge of said outer layer material is tracked.

22. The invention as defined in claim 14 wherein said feed rollers further include tensioning means for resisting the driven take-up drum and evenly feeding said outer layer material.

23. The invention as defined in claim 22 wherein said tensioning means further includes:
   a wheel coaxially mounted with and fixedly connected to said feed rollers;
   a brake lever pivotally mounted at one end and adapted to selectively engage said wheel; and
   adjustable spring means connected to said brake lever for varying the force applied to said wheel by said brake lever.

* * * * *